United States Patent [19]

Park

[11] Patent Number: 5,457,676
[45] Date of Patent: Oct. 10, 1995

[54] TURNTABLE OF A DISK PLAYER WITH A RESILIENTLY BIASED MAGNET

[75] Inventor: Byeongsoo Park, Seoul, Rep. of Korea

[73] Assignee: Daewoo Electronics Co., Ltd., Seoul, Rep. of Korea

[21] Appl. No.: 159,658

[22] Filed: Nov. 30, 1993

[30] Foreign Application Priority Data

Nov. 30, 1992 [KR] Rep. of Korea .................. 92-23986

[51] Int. Cl.[6] .................................................. G11B 17/028
[52] U.S. Cl. ................................... 369/270; 360/99.12
[58] Field of Search .................................. 369/270, 271, 369/263; 360/99.05, 99.12, 98.08, 99.08, 99.04, 99.06

[56] References Cited

U.S. PATENT DOCUMENTS

| | | | |
|---|---|---|---|
| 3,156,472 | 11/1964 | Brock | 274/23 |
| 3,193,295 | 7/1965 | Isemura | 274/9 |
| 3,223,422 | 12/1965 | Ernst | 274/9 |
| 3,768,815 | 10/1973 | Matherin | 274/40 |
| 3,891,796 | 6/1975 | Takahara et al. | 178/6.6 |
| 3,972,535 | 8/1976 | Bleiman | 274/39 |
| 4,053,161 | 10/1977 | Bleazey et al. | 274/23 |
| 4,068,851 | 1/1978 | Yamamura | 274/39 |
| 4,098,511 | 7/1978 | Leedom | 274/9 |
| 4,124,866 | 11/1978 | Coleman | 358/128 |
| 4,194,743 | 3/1980 | Ohsawa et al. | 274/1 |
| 4,232,870 | 11/1980 | Iemenschot | 274/39 |
| 4,306,259 | 12/1981 | Saito et al. | 360/99 |
| 4,416,003 | 11/1983 | Suzuki | 369/75.2 |
| 4,420,830 | 12/1983 | Green | 369/270 |
| 4,466,031 | 8/1984 | Muraoka | 360/99.12 |
| 4,498,161 | 2/1985 | Eisemann | 369/75.2 |
| 4,509,157 | 4/1985 | Morinaga | 369/75.2 |
| 4,772,971 | 9/1988 | Tokuda | 369/270 |
| 4,864,441 | 9/1989 | Tezuka | 369/270 |
| 5,177,731 | 1/1993 | Tanaka et al. | 369/270 |
| 5,228,023 | 7/1993 | Hartog | 369/271 |

Primary Examiner—John H. Wolff
Assistant Examiner—Kevin M. Watkins
Attorney, Agent, or Firm—Beveridge, DeGrandi, Weilacher & Young

[57] ABSTRACT

The present invention relates to a turntable for a disc player having a pivotal lid on which a disc cartridge loader is mounted for opening and closing. The turntable according to the present invention has a permanent magnet mounted in it, so that a miniaturization and lightweightness of a disc player can be achieved since a disc is firmly fixed on the turntable and correctly seated on the turntable without pushing the disc out of the center of the turntable when closing the pivotal lid of the disc player.

1 Claim, 3 Drawing Sheets

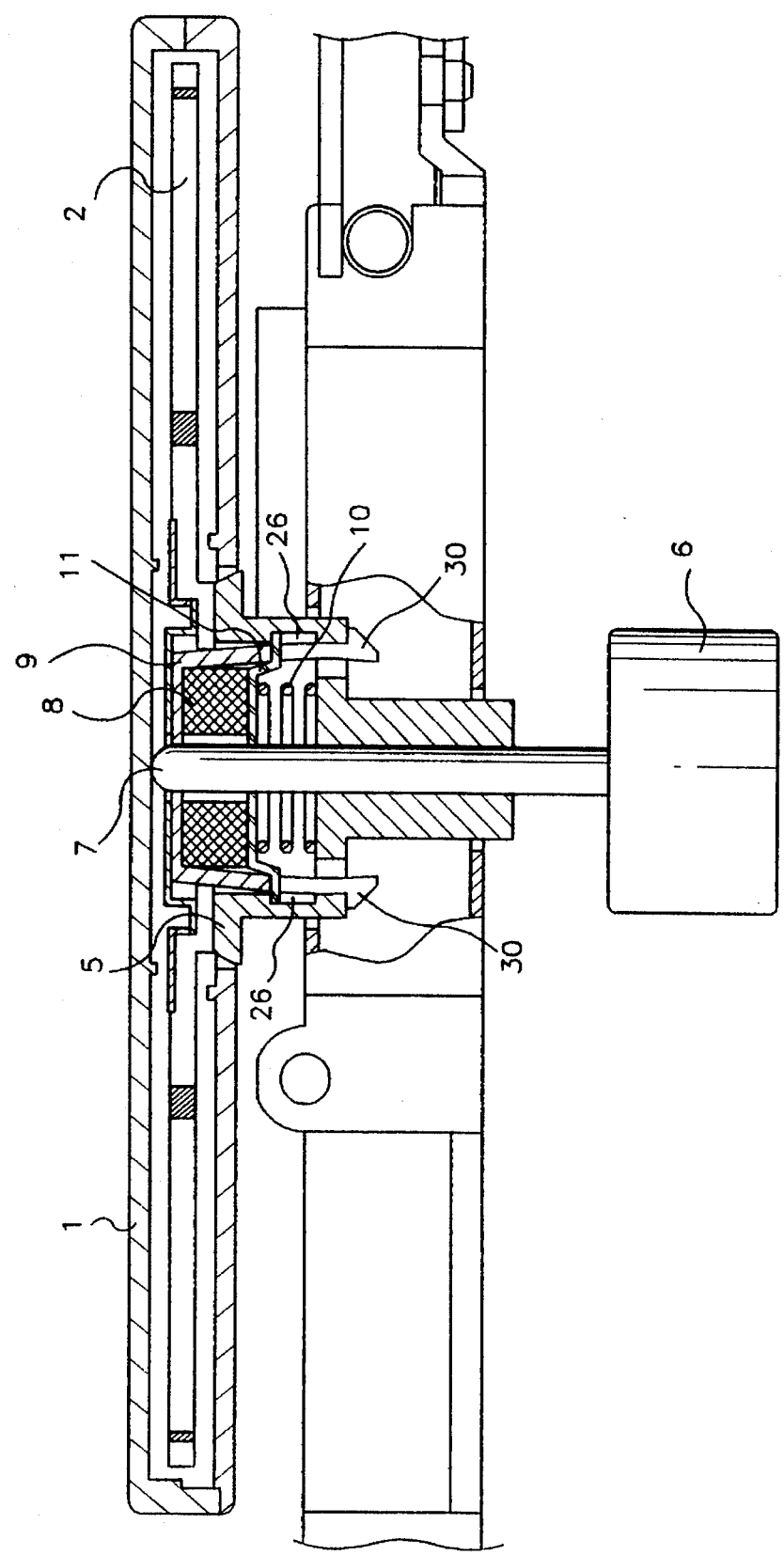

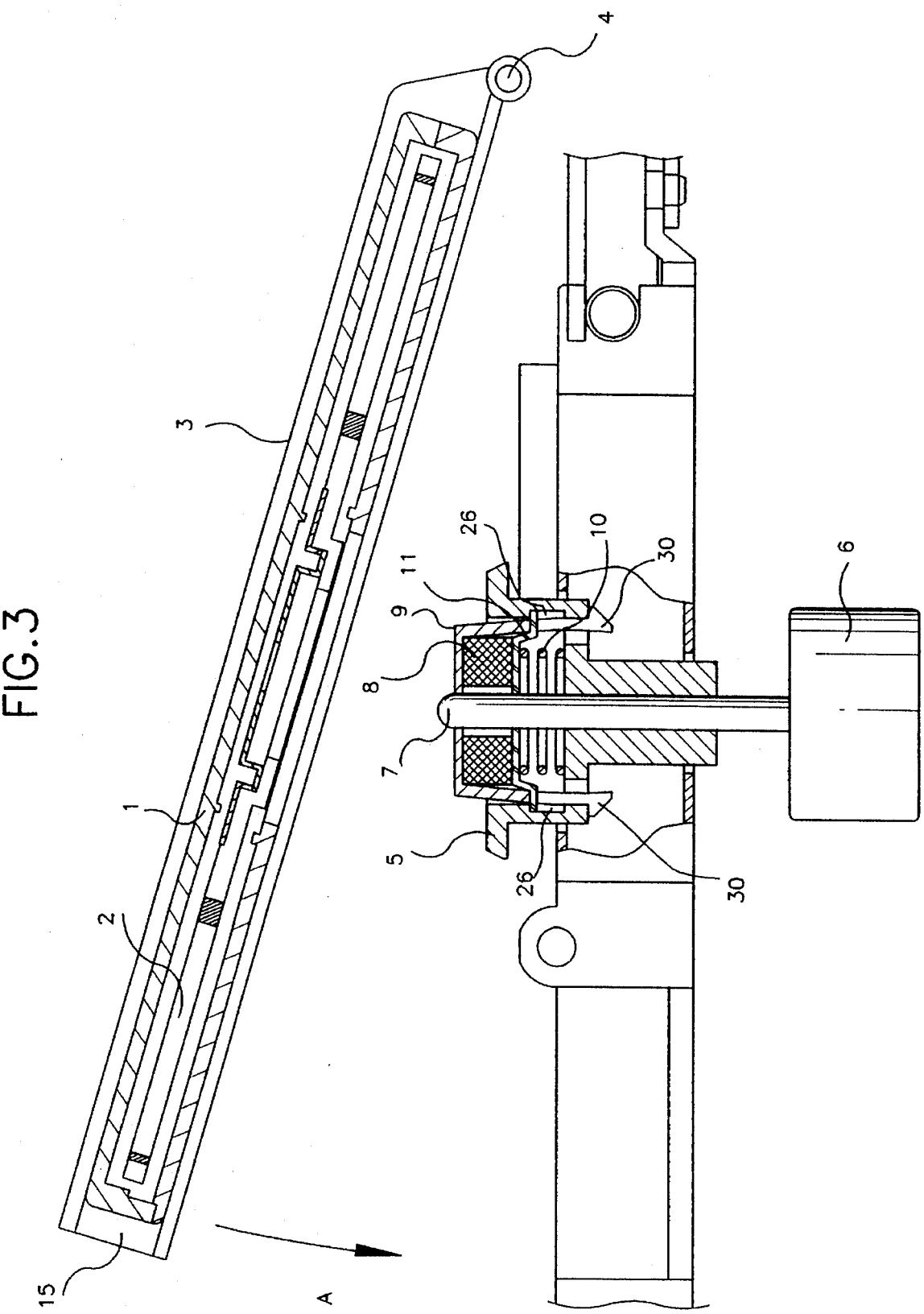

TURNTABLE OF A DISK PLAYER WITH A RESILIENTLY BIASED MAGNET

BACKGROUND OF THE INVENTION

1. Field of the Invention

The present invention relates to a turntable of a disc player, more particularly to a turntable of a disc player capable of firmly holding a disc seated on it by means of a permanent magnet mounted inside it.

2. Description of the Prior Art

In general, a disc in a mini disc player is pressed to be firmly fixed by a disc clamper.

One such prior art disc player is disclosed in U.S. Pat. No. 4,509,157 granted to Kaoru Morinaga, which has a disc clamper for clamping a disc seated on a turntable.

The disc clamper comprises a reel fixed to a subchassis by a screw; a winding around the outer periphery of the reel; a clamp member having a hole, which is inserted into the reel and movable up and down; a ring-like permanent magnet mounted around the outer periphery of the clamp member; and a rod fixed to the subchassis and penetrating a hole of the clamp member, so that the reel is sandwiched between the subchassis and the rod, In the above disc clamper, a disc on the turntable is urged by the clamp member when a magnet field generated around the winding in a DC current flow repels the magnet by electromagnetic force effected between the winding and the magnet.

Therefore, there exists a problem in that, since the disc clamper has to be seperately installed above the turntable, a disc player can not be made miniaturized.

As another prior art, U.S. Pat. No. 4,498,161 granted to Kurt Eisemann discloses a disc player provided with a pivotal lid mounting a disc loader, wherein a disc cartridge is loaded into the disc loader and a disc in the disc cartridge is fixed on the turntable when the pivotal lid is closed.

In the above disc player, there is a problem in that a disc is not seated on the turntable correctly since the disc moves to the opposite direction of insertion by a contact of a part of the disc with the turntable before the disc is fully seated on the turntable when the pivotal lid is closed.

SUMMARY OF THE INVENTION

An object of the present invention is to provide a turntable for a disc player which is capable of firmly and correctly holding a disc seated on it by means of a permanent magnet mounted inside it.

In order to accomplish the above object, in a turntable for a disc player seating and lifting a disc on and from the turntable by a pivotal movement of a lid with a disc cartridge loader, the turntable according to the present invention comprises a cylindrical groove formed at the central portion, three longitudinal insertion grooves formed at certain intervals around the inner peripherial wall of the cylindrical groove, three lateral guide grooves formed respectively at proper positions of the insertion grooves, three end grooves formed at the ends of the guide grooves and in the bottom of the cylindrical grooves respectively, a spindle motor shaft mounted at the center of the cylindrical groove, a coil spring for providing a resilient force, a support plate mounted on the coil spring, a permanent magnet mounted on the support plate, a cover with three hooks mounted on the permanent magnet for holding the permanent magnet inside the cylindrical groove, wherein the hooks are hooked through the holes formed in the bottom of the cylindrical grooves respectively, and wherein the cover 9, the permanent magnet 8 and the support plate 11 have a hole at the center respectively. With the above structure of the turntable according to the present invention, a miniaturization and lightweightness of a disc player can be achieved since a disc is firmly fixed on the turntable, and correctly seated on the turntable without the center of disc being pushed out from the center of the turntable in the radial direction with pivotal lid axis in the center when closing the pivotal lid of the disc player.

BRIEF DESCRIPTION OF THE DRAWINGS

FIG. 2 is a cross-sectional view of a turntable for a disc player according to the present invention on which a disc is seated.

FIG. 3 is a cross-sectional view of a disc player with its lid having a disc cartridge loader opened, together with the turntable mounted in it.

DESCRIPTION OF THE PREFERRED EMBODIMENT

Figure 1:
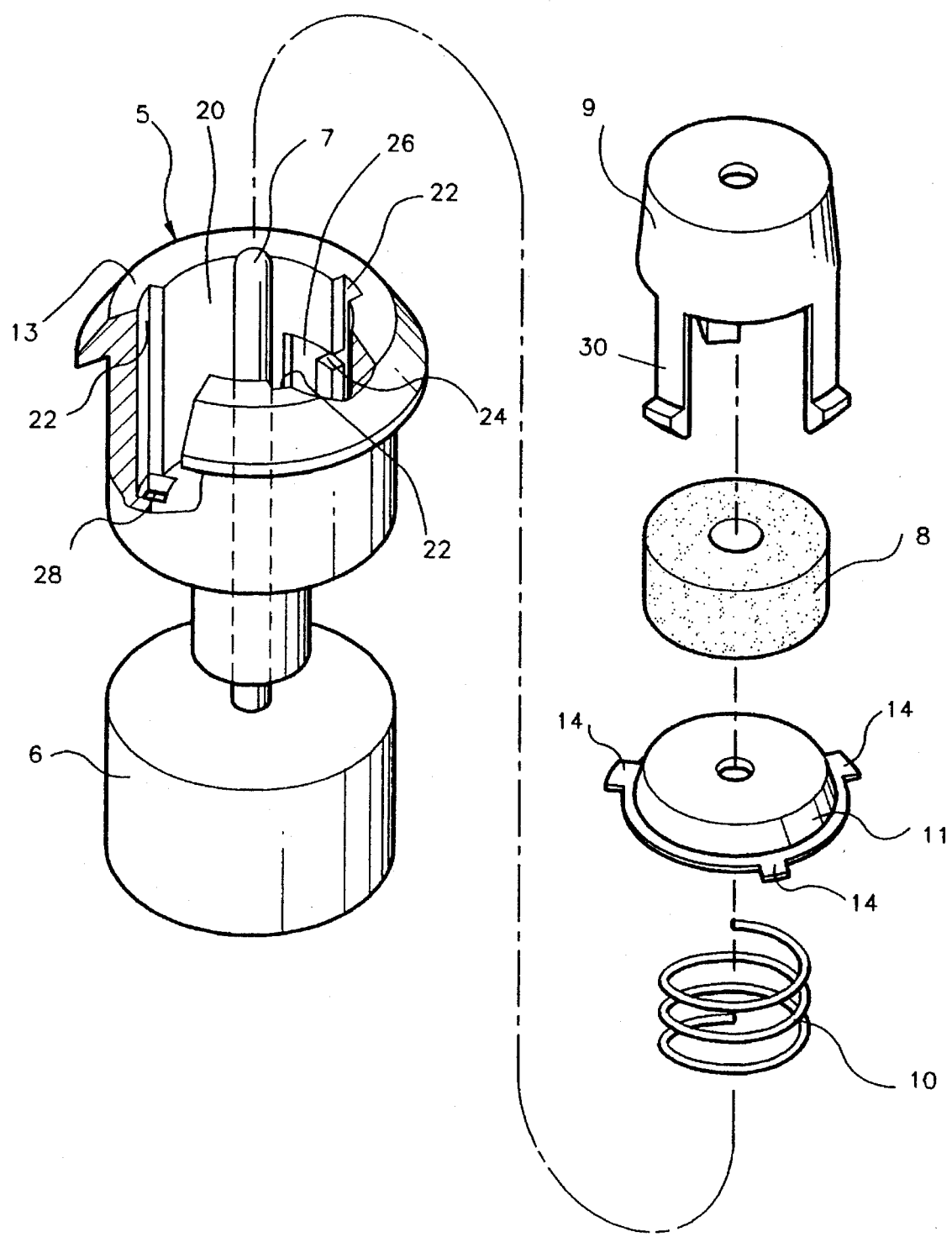
FIG. 1 is a perspective view of a disassembled turntable of a disc player according to the present invention.

FIG. 1 is a perspective view of a disassembled turntable of a disc player according to the present invention. FIG. 3 is a cross-sectional view of a disc player with its lid having a disc cartridge loader opened, together with the turntable mounted in it. As shown in FIG. 2 and FIG. 3, in a turntable for a disc player seating and lifting a disc on and from the turntable by a pivotal movement of its lid with a disc cartridge loader for opening and closing, the turntable 5 according to the present invention comprises a cylindrical groove 20 formed at the central portion; three longitudinal insertion grooves 22 formed at certain intervals around the inner peripheral wall of the cylindrical groove 20; three lateral guide grooves 24 formed at proper positions of the insertion grooves 22; three end grooves 26 formed at the ends of the guide grooves 24 respectively; three insertion holes 28 formed just under the insertion grooves 22 on the bottom of the cylindrical groove 20 respectively; the shaft 7 of a spindle motor 6 mounted at the center of the cylindrical groove 20, a coil spring 10 for providing a resilient force: a support plate 11 having three protrusions 14, which is mounted on the coil spring 10; a permanent magnet 8 mounted on the support plate 11; a cover with three hooks 30 mounted on the permanent magnet 8 for holding the permanent magnet 8 inside the cylindrical groove 20, wherein the hooks 30 are hooked through the holes 28 formed in the bottom of the cylindrical groove 20 respectively, and wherein the cover 9, the permanent magnet 8 and the support plate 11 have a hole at the center respectively in order for them to be inserted onto the shaft 7.

FIG. 2 is a cross-sectional view of a turntable for a disc player according to the present invention on which a disc is seated. As shown in FIG. 2, in the state that, when a disc 2 in a disc cartridge 1 is seated on the turntable 5, the disc 2 is firmly fixed on the turntable 5 by a permanent magnet 8.

In the meantime, as shown in FIG. 3, when a lid 3 is closed in the direction of arrow A after the disc cartridge 1 is inserted into the disc cartridge loader 15 in a open state of the lid 3, a part of the disc 2 is contacted with a cover 9 mounted on the turntable 5 at the first time.

However, the center of the disk 2 is not pushed out from the center of the turntable in the radial direction with pivotal lid axis in the center of the turntable because of a permanent magnet 8.

At this time, a support plate 11 installed under the magnet 8 moves downwards along the end grooves 26 together with the cover 9 and presses a coil spring 10.

When the disc 2 is completely seated on the turntable 5, the restoring force of the coil spring 10 pushes the support plate 11 upwards, so that the disc 2 is firmly fixed on the turntable 5.

As described above, in the structure of the turntable according to the present invention, even though a part of a disc is contacted with the turntable at the first time, since the disc is firmly fixed on the turntable by means of a permanent magnet mounted in the turntable, the disc is correctly seated and firmly fixed on the turntable without pushing out of the center of the turntable when closing the lid, a miniaturization and lightweightness of a disc player can be achieved.

What is claimed is:

1. In a turntable for a disc player with a resiliently biased permanent magnet to seat and lift a disc on and from the turntable by a pivotal movement of its lid with a disc cartridge loader for opening and closing, the turntable comprising:

a central portion having a cylindrical groove in an axial direction of a rotary drive shaft of the turntable, and a plurality of axial insertion grooves formed at certain intervals circularly along the inner peripheral wall of said central portion, a plurality of lateral guide grooves each perpendicularly crossing respective ones of the axial insertion grooves, a plurality of end grooves each extended downwardly from one end of each of the lateral guide grooves, and a plurality of insertion holes each provided at a lower end of each of the insertion grooves;

a spindle motor shaft provided axially on a center in the cylindrical groove of said central portion for rotating the turntable;

a coil spring provided on a bottom of said central portion for giving resiliency so that the disc can be seated resiliently on the turntable;

a support plate having a through hole for putting it onto said spindle motor shaft and having a plurality of protrusions for moving downward and upward resiliently within said end grooves by said coil spring when the disc is seated on the turntable;

the permanent magnet having a through hole for putting it onto the shaft, which is provided on the support plate; and a cover which has a through hole for putting it onto the shaft, and has a plurality of hooks to be hooked respectively through said insertion holes, wherein the cover covers the permanent magnet and holds it inside the cylindrical groove;

so that the disc can be correctly seated on the turntable without a center of disc being pushed out from a center of the turntable.

* * * * *